INVENTOR
Patrick W. Shellenberg
HIS ATTORNEYS

United States Patent Office 3,381,692
Patented May 7, 1968

3,381,692
CIGAR PRESS
Patrick W. Shellenberg, Richmond, Va., assignor to The American Tobacco Company, New York, N.Y., a corporation of New Jersey
Filed Apr. 6, 1966, Ser. No. 540,684
3 Claims. (Cl. 131—87)

ABSTRACT OF THE DISCLOSURE

Press for shaping otherwise completed cigars. Specially arranged and constructed mold section mechanism in association with two superposed pairs of endless chains which because of its special construction has a desired high rate of production.

---

This invention relates to presses for shaping cigars. Because the conventional method of making cigars involves the rolling of the tobacco leaves, the natural shape of cigars is cylindrical in cross section or end view. It is common practice, however, to alter this round shape to one which is generally square for ease in packaging and improvement in appearance.

By the present invention, I have provided a press which, while the cigars are moist immediately after being made, compresses them from their natural round shape into the desired cross section which has four relatively flat equal sides with rounded corners.

The press is so constructed that the cigars are formed to the desired shape as they move along a predetermined path of travel, the cigars being admitted to the pressing mechanism at one point in this path and the pressed cigars being delivered or removed from the pressing mechanism at a later point. The pressing is thus a continuous operation and the apparatus may be operated indefinitely and without interfering with the cigar making or packing operations.

The apparatus of the invention is illustrated by way of example in the accompanying drawings in which:

FIG. 3 is a vertical section taken on broken line 3—3 of FIG. 2; and

FIG. 4 is a detailed section taken on line 4—4 of FIG. 2.

Figure 1:
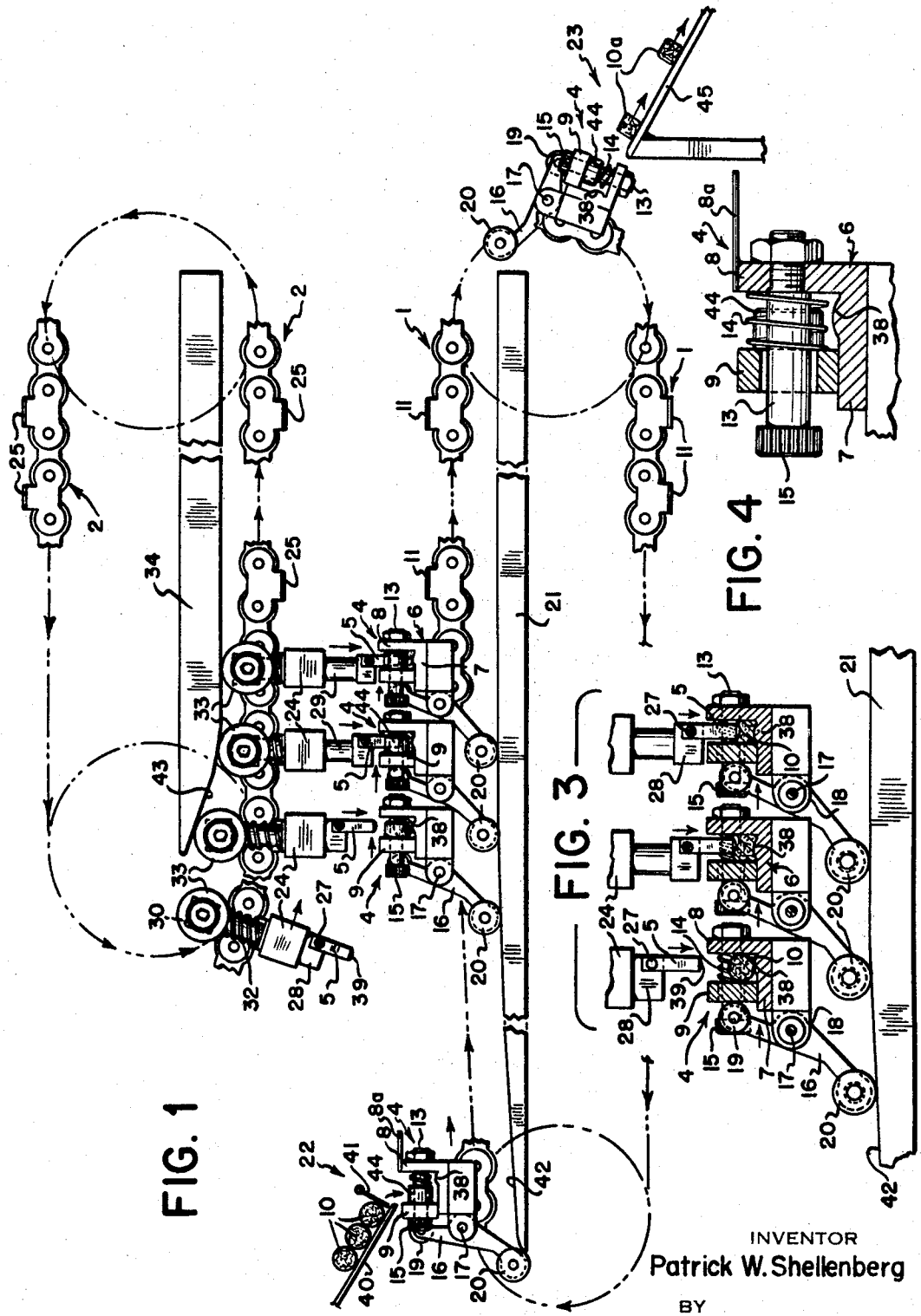
FIG. 1 is a diagrammatic partial side view of the cigar pressing apparatus.
Figure 2:
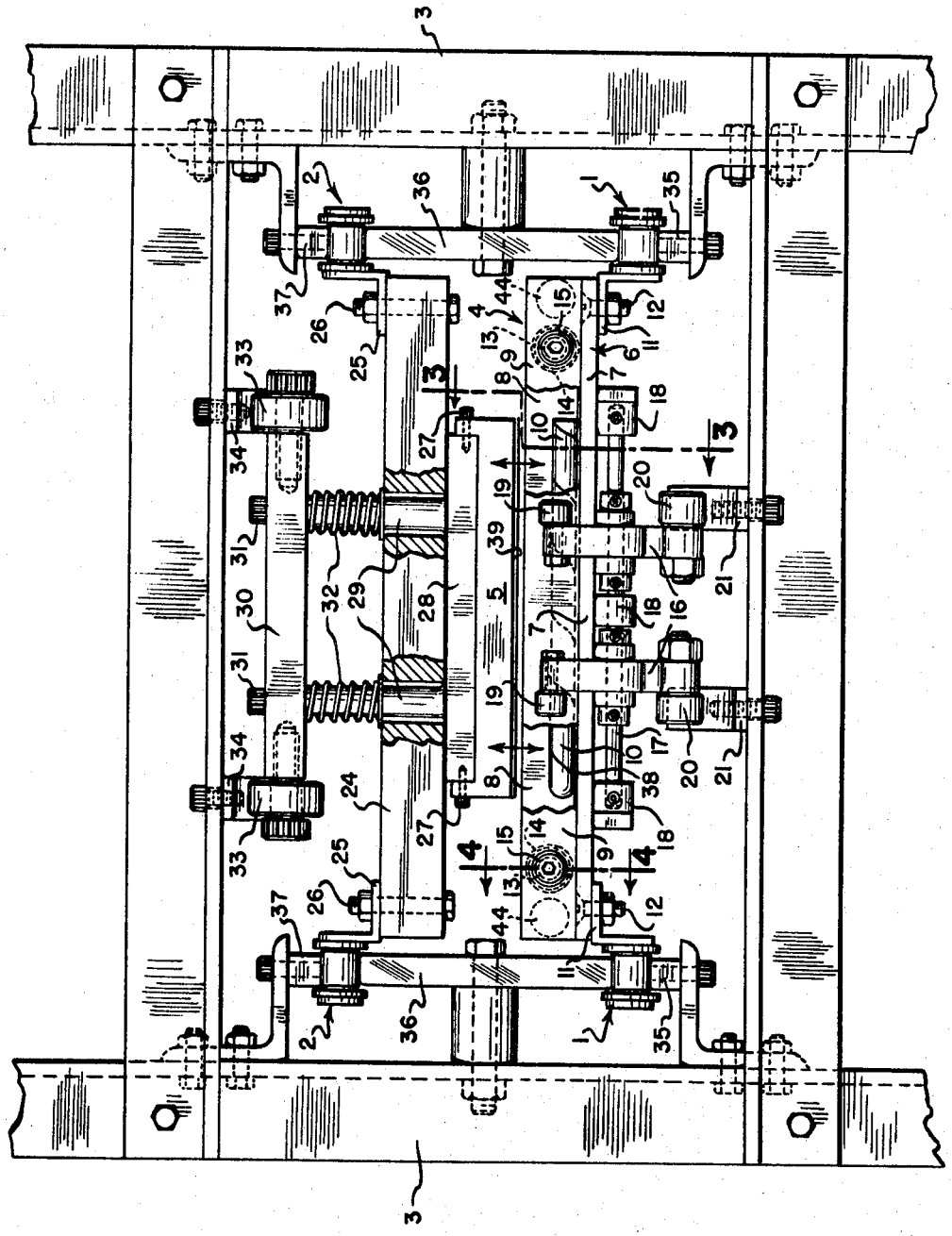
FIG. 2 is an end view of the apparatus with some parts broken away and certain parts omitted.

Referring to these drawings, the apparatus comprises a lower pair of endless chains 1 (FIG. 2) and an upper pair of endless chains 2 which are trained about the lower and upper sets of sprockets shown by dot and dash lines in FIG. 1 but which are not visible in FIG. 2. One chain of each pair is shown in FIG. 1. One run or reach of each chain of each pair is shown in FIG. 2 in cross section. These sprockets are mounted on parallel shafts which are carried in suitable bearings supported in the frame 3 of the machine indicated in FIG. 2. These sprockets are suitably driven by means (not shown) in timed relation so that the adjacent reaches or runs of the pairs of chains 1 and 2 move toward the right in the direction of the arrows in FIG. 1 at the same uniform speed.

The lower chains 1 carry mold sections 4 (FIGS. 1 and 4) and the upper chains 2 carry plungers 5 which are arranged to cooperate with the mold sections. Only a few of these mold sections and plungers are shown in FIG. 1 but it will be understood that they are arranged in equally spaced relation throughout the lengths of the respective pairs of chains 1 and 2.

Each of the mold sections 4 comprises an L-shaped member 6, the horizontal part 7 of which constitutes the bottom of the mold, and the upright part 8 of which constitutes the rear wall. The front wall 9 is movable or shiftable as will be described later. The L-shaped members 6 are considerably longer than the length of the longest cigar 10 which will be operated upon by the press, and the opposite ends of the L-shaped members of each mold section are secured by means of bolts 12 (FIG. 2) to flat horizontal formations 11 which are supported by the outside links (referring to the chain structure) of the pairs of chains 1. Chains 1 and 2 advantageously have a 1″ pitch so that formations 11 are spaced 2″ apart, but it will be understood that these chains may have a longer or shorter pitch to suit any desired conditions.

The front or shiftable wall 9 of each of the mold sections 4 rests upon the upper surface of the bottom wall 7 and is held in position by means of two horizontal posts or pins 13 which are fixed in apertures in the stationary or rear wall 8 of the mold section as shown in FIG. 4. A compression coil spring 14 surrounds each of the posts 13 and these springs urge the movable wall 9 to the left or towards the open position of the mold section, the maximum opening being determined by the engagement of the outer surface of wall 9 with a head 15 on each of the posts 13.

The shiftable wall 9 of each of the mold sections 4 is moved to the right, to compress a cigar which has been received within the mold section, by means of a pair of pivoted levers or fingers 16 which are pivoted centrally between their ends on a rod 17 which is mounted in stationary position by means of brackets 18 welded or otherwise secured to the lower surface of bottom wall member 7. At their upper ends levers 16 are provided with rollers 19 which bear against the outer surface of shiftable wall 9. At their lower ends fingers 16 have rollers 20 which bear upon a lower stationary cam rail 21 which is mounted on frame 3 of the apparatus and extends from the in-feed position 22 at the left of FIG. 1 to the delivery position 23 at the right end of the apparatus. The function of these rails will be referred to later on.

The plungers 5 are carried forward to the right by means of the pair of chais 2 in vertical alignment with the respective mold sections 4, each plunger having a supporting bar 24 which extends between the two chains. Each of these bars 24 as shown in FIG. 2 is mounted at its ends on bracket formations 25 on the chains. These formations are similar to formations 11 on the pair of chains 1 previously described. Bars 24 are secured in position by means of bolts 26.

Each of the plungers 5 is elongated horizontally as shown in FIG. 2 and is secured at each end by means of screws 27 to a horizontal support 28. Support 28 has two parallel integral posts 29 projecting upwardly therefrom and secured at their upper ends to a horizontal bar 30 by means of screws 31. Compression coil springs 32 on posts 29 urge support 28 towards its upper position in contact with support 24, in which position the plunger 5 thereon is above the corresponding mold section 4 below it. On the outer ends of member 30 are rollers 33 which are engaged by a second pair of stationary rail cams 34 mounted in generally parallel position with respect to the rails 21 and extending to the delivery end of the apparatus.

It is important that the adjacent runs of the two pairs of chains 1 and 2 be so guided as to maintain them at constant distances from one another during the pressing operation along the path of travel. This is accomplished by the construction shown in FIG. 2 where the rollers of lower chains 1 are supported on horizontal track members 35. Above the chains 1 and extending upwardly to the pair of chains 2 there is a guide member or spreader 36 on each side of the apparatus. The lower edges of these two members serve to prevent lower chains 1 from rising upwardly, and the upper edges of members 36 form track surfaces for the rollers of the upper chains 2. Also engaging the upper surfaces of the rollers of these upper chains are two upper track members 37 which are similar to tracks 35 below.

The supports or spreader members 36 are mounted in fixed position on the opposite sides of frame 3 as shown in FIG. 2, while the rails 35 and 37 are supported on angle brackets as shown, in such a way as to be adjustable vertically and laterally as may be required in positioning them properly with respect to the pairs of chains 1 and 2. Guide members 36 may be made of metal or any suitable material, but advantageously they are of a plastic material which is both rigid and transparent so that the progress of the cigars through the machine can be observed.

Referring more especially to FIGS. 3 and 4, the upper surface of each of the bottom walls 7 of mold sections 4 is formed with an upwardly rounded ridge 38 which extends throughout the length of the mold section. Also the lower ends of plungers 5 are each formed with a similar but oppositely directed ridge 39 which extends throughout the operative length of each plunger. The purpose of these cooperating ridges will be referred to below.

In the operation of the cigar pressing apparatus the empty mold sections 4 are carried by the lower pair of chains 1 along the lower reach of these chains, the fingers or levers 16 thus being free of the lower rail cams 21, and consequently springs 14 maintain the shiftable walls 9 in their wide open position against the shoulder of heads 15 of pins 13. In this condition each of the mold sections 4 arrives at the in-feed position 22 of FIG. 1. The foremost cigar on a feed chute 40 is admitted past a feed gate 41 and drops by gravity into the mold section between the fixed and movable walls 8 and 9. Should it be desired to insure that each cigar is received properly within each mold section this may be done in various ways, for example, by providing lugs or fingers 8a (shown at the left of FIG. 1 and also in FIG. 4) projecting from the top of fixed wall 8. An appropriate number of such fingers could be spaced along the upper surface of fixed wall 8 (FIG. 2), although the fingers 8a have not been included in this figure.

Such fingers extend to the right or forwardly from wall 8 a sufficient distance to support a cigar but not far enough to interfere with the mechanism of the next mold section 4. Also if desired a stationary brush may be arranged just ahead of the mold section shown at the left of FIG. 1 so that as the mold section moves ahead a cigar supported by fingers 8a will be swept into the space between walls 8 and 9 of the mold section.

A cigar which has been received in a mold section is indicated at 10 in FIG. 2 and also at the left in FIG. 3. From FIG. 2 it will be seen that the ends of the cigar are between the two posts or pins 13. It will be understood that any desired form of mechanism may be used for feeding the cigars individually to the successive mold sections 4 as they arrive at in-feed position 22.

As a given mold section 4 moves to the right from position 22, the rollers 20 of pivoted fingers 16 engage the ends of lower rail cams 21 and the fingers are swung somewhat as these rollers arrive on the upper sloping surface 42 of these rail cams. Such sloping surface extends from the left ends of the rails to approximately the position of the middle pressing unit (mold section 4 and plunger 5) shown in FIG. 1. During this movement the wall 9 is slowly moved to the right thereby exerting lateral compression against the sides of cigar 10.

During the latter part of this movement, a plunger mechanism which has traveled to the left along the upper reach of the pair of chains 2 now swings around the pair of sprockets at this end, and its operating rollers 33 pass into contact with the sloping surface 43 of the upper pair of rail cams 34. Rollers 33 are forced downwardly as the pressing unit moves to the right thereby forcing its plunger 5 downwardly as shown at the mid position of FIGS. 1 and 3.

It will be seen that the lengthwise ridges 38 and 39 respectively on the mold section bottom 7 and plunger 5 are producing grooves or concave surfaces in the upper and lower surfaces of the cigar. As the tobacco is very damp, or even wet, the outer leaf of the cigar can be bent sharply at the corners without fear of making abrasions and the tobacco is caused to flow towards the sides of the mold during the pressing operation. Ridges 38 and 39 which are shown as being arranged on the upper surfaces of bottom walls 7 and on the lower surfaces of plungers 5, may, if desired, be omitted, and similar ridges placed on the two opposite side walls 8 and 9.

The pressing operation continues until the pressing unit (mold section 4 and plunger 5) reaches the third or right hand position shown in FIGS. 1 and 3. At this position rail cams 34 have forced plunger 5 downwardly to its maximum extent, and lower rail cams 21 have forced movable wall 9 to the right to its maximum extent which is shown as being limited by means of two cylindrical spacers 44, one mounted near each end of movable wall 9 (FIGS. 2 and 4). Although spacers 44 have been shown in the drawings they may be omitted as they are not essential.

Cigar 10 in its final degree of compression in both directions as shown at the right in FIG. 3 continues throughout the length of the apparatus, or until the rollers 20 of fingers 16 pass off the right hand ends of lower rail cams 21, and plunger rollers 33 pass off the right ends of upper rail cams 34. The release of rollers 20 by the ends of rail cams 21 allows the mold section to open and, as it travels around the chain sprockets at discharge position 23, the pressed cigars 10a are removed by gravity, or otherwise, and may pass down an inclined chute 45, or otherwise be conveyer away.

As the cigars are released by the pressing mechanism their sides become flat and square but their corners are rounded as shown at 10a and FIG. 1.

Should it be desired to set up the machines for pressing a different size of cigar, the lower rail cams 21 can be adjusted vertically in frame 3 of the apparatus to change the extent of the lateral movement of shiftable walls 9, and plungers 5 are easily removable and may be replaced with plungers of different dimensions, if desired. Shiftable walls 9 need not necessarily be replaced, although they may be changed if desired. Also the upper rail cams 34 can be adjusted vertically so as to produce the right amount of compression for the different size of cigar. Furthermore it will be understood that rail cams 21 and 34 can be adjusted lengthwise so as to provide any desired timing of movement of the movable side walls 9 of the mold sections and of the plungers 5.

I claim:
1. In a cigar pressing apparatus employing lower and upper pairs of equally spaced endless chains arranged one pair vertically above the other, stationary guides for the lower and upper sides of each chain of each pair as the chains travel in the same direction along adjacent runs, the combination therewith which comprises elongated rigid plunger bars rectangular in cross section carried by the upper pair of chains, and means for forcing said bars downwardly during their travel along the stationary guides for said upper pair of chains, and mold sections carried by the lower pair of chains, each of said mold sections comprising a rigid bar rectangular in cross section constituting the floor of the mold section and extending between the chains of the lower pair and having its ends secured to links of said chains, an upright rigid bar secured thereto and constituting the rear wall of the mold section, a front wall therefor consisting of a rigid bar rectangular in cross section resting on said floor, means for securing said bar in slideable relation to said floor and in parallel relation to said rear wall, at least two levers pivotally mounted intermediate their ends forwardly of the front edge of said floor, the upper end portions of said levers engaging the outside of said front rectangular bar, stationary cam members for engaging the lower ends of said levers and causing them to force said rectangular bar towards said rear wall during the travel of the mold section along the stationary guides for the lower pair of chains.

2. Cigar pressing apparatus according to claim 1 in which the means for securing the front wall rigid bar comprises a post projecting near each end of the rear wall and received in an aperture in the front wall, and a coil spring on each post for urging the front wall to open position.

3. Cigar pressing apparatus according to claim 1 in which the chains of the upper pair have plunger member supporting bars extending between them and secured at their ends to the chain links, each plunger member having two spaced parallel posts projecting through apertures in its supporting bar, the posts being secured at their upper ends to a second bar disposed parallel to the supporting bar, a compression coil spring surrounding each of said posts, said springs urging the plunger member upwardly, and a pair of stationary cam rails engaging rollers on said second bars and forcing said plunger member downwardly during the travel of the supporting bars along said stationary guides for the upper pair of chains.

References Cited

UNITED STATES PATENTS

| 1,079,581 | 11/1913 | Preissler et al. | 131—87 |
| 1,571,968 | 2/1926 | Roby | 131—87 |
| 3,189,033 | 6/1965 | Dreher | 131—81 |
| 3,266,498 | 8/1966 | Oppenheimer et al. | 131—81 |

FOREIGN PATENTS

| 862,114 | 1/1953 | Germany. |
| 1,083,735 | 6/1960 | Germany. |

HUGH R. CHAMBLEE, *Primary Examiner.*